United States Patent Office 2,721,187
Patented Oct. 18, 1955

2,721,187

TREATMENT OF RUBBERS

Philip A. Roussel, Wilmington, Del., assignor to E. I. du Pont de Nemours and Company, Wilmington, Del., a corporation of Delaware No Drawing. Application January 25, 1954,
Serial No. 406,093

3 Claims. (Cl. 260—45.85)

This invention relates to the compounding of both natural and synthetic rubber, and more particularly to a method for preventing or retarding the formation of cracks in the surfaces of vulcanized rubbers on exposure to sunlight and ozone and also for retarding the normal effects of atmospheric oxidation.

When rubber surfaces are exposed to air, a gradual change and reduction of quality takes place throughout the rubber, involving hardening and decrease in extensibility, quantitatively shown by increase in modulus of elasticity and decrease in tensile strength and elongation at break. This change may be controlled by a variety of antioxidants, well known in the art, but more effective agents are desirable. Another form of deterioration, however, is not believed to be caused by oxygen and takes place when exposed rubber surfaces are either statically or dynamically stressed, forming surface cracks. This form of failure is sometimes called sun-cracking or ozone cracking, and is believed to be due to small amounts of ozone in the air. The number and depth of the cracks depend on the severity of the exposure and the amount of stress applied. Obviously, as the cracking becomes more severe the quality of the rubber, as measured for example by tensile strength, falls sharply and the rubber finally fails.

The conventional rubber antioxidants are in general rather ineffective in controlling cracking of this type, which indicates that atmospheric oxidation is not alone involved in the surface cracking of rubbers. Radically different anti-cracking agents have been sought and are used to some extent. Thus when the rubber is not to be considerably flexed, it has been found satisfactory to incorporate certain waxes which "bloom" upon the surface, forming a protective layer. This protection is of no value when the rubber is repeatedly flexed. Certain agents have been found that greatly reduce the cracking of flexed natural or synthetic rubbers exposed to sunlight but at the same time they accelerate normal oxidation, again showing that oxidation and cracking have somewhat different causes.

It is therefore an object of this invention to provide a process for preventing or retarding the formation of cracks in the surfaces of vulcanized rubber on exposure to sunlight and ozone, and also to retard the normal effects of atmospheric oxidation. It is a more specific object of the invention to provide a method of compounding both natural and synthetic rubbers by incorporating therein relatively small amounts of a diarylamine and an N-arylethylenediamine.

I have found that 1,3-diene elastomers, including both natural and synthetic rubbers, may be made more resistant to cracking on exposure to sunlight and ozone and also more resistant to the effects of atmospheric oxygen by incorporating therein, prior to vulcanization, from 0.25% to 5.0% of a diarylamine and from 0.25% to 5.0% of an N-arylethylenediamine of the formula:

$$ArNHCH_2CH_2NH_2$$

or its carboxylic acid salt. In the N-arylethylenediamine the aryl group is of the benzene series and may contain one or more non-acidic substituent such as alkyl, halogen, and the like, of which the phenyl, tolyl, xylyl, chlorophenyl and bromophenyl are examples.

The diarylamines are those which are generally recognized as rubber antioxidants, and are typified by diphenylamine and phenyl-beta-naphthylamine.

The carboxylic acid salts of the above N-aryl ethylenediamine, which may be used instead of the base itself, are new compounds and are well defined crystalline solids, compatible with rubber, and are made by mixing the free base with the appropriate carboxylic acid. Ordinarily the second nitrogen in the ethylene diamine to which the aromatic group is attached does not take part in salt formation under the conditions employed. In the case of a dibasic acid, one mol may be combined with either one or two mols of the base.

A convenient method for making these salts is to dissolve the required quantities of acid and base separately in a volatile, non-polar solvent such as an aromatic or aliphatic hydrocarbon, an ether, or a halogenated hydrocarbon (such as carbon tetrachloride) and mix the two solutions. The salt separates in crystalline form and is filtered off and dried. Alternatively, the reaction may be carried out in a solvent for the salt, such as water or ethyl alcohol, and the salt recovered by evaporation. In some cases the reaction is conveniently carried out without solvent, preferably above the melting point of the salt. Organic carboxylic acids having up to 8 carbon atoms have been found to be satisfactory for the formation of these salts, as illustrated in the following examples.

Melting points of representative salts used in this invention are as follows:

| Acid Used with Phenylethylenediamine | Melting Point ° C. |
|---|---|
| Acetic | 106.5–108 |
| Formic | 105 |
| Benzoic | 116–117 |
| Phenylacetic | 119–120 |
| Oxalic (½ mol) | 203–204 |
| Oxalic (1 mol) | 192–193 |
| Carbon dioxide (1 mol) | 81–82 |
| p-Tolyl ethylenediamine and acetic acid | 123–123.5 |

The elastomers to which the present invention particularly relates are natural rubber (crepe, smoked sheets, etc.) or any synthetic rubber containing at least 50% of a polymerized 1,3-diene such as polymers of chloroprene, butadiene or isoprene, or copolymers of these with other copolymerizable compounds.

The present invention is based on the discovery that, by using a combination of the diarylamine and the N-arylethylenediamine or its carboxylic acid salts, a greater stabilizing effect is obtained against deterioration of either natural or synthetic rubber in the vulcanized state than where either the antioxidant or the agent which stabilizes against sun-cracking is employed alone, even when the single components are used in amounts equal to the total amount of the mixture.

The following examples are given to illustrate this invention. The stabilizing compounds of this invention were tested for their effect upon cracking by incorporation into elastomers and subjecting the vulcanized elastomer to both accelerated and natural aging tests. The anti-ozone properties of the vulcanized elastomer containing the subject compound were evaluated in two tests, (1) an accelerated test consisting of exposure to the elastomer under 20% stress to air containing one part per million of artificially generated ozone, and (2) a practical test consisting of exposure of stressed samples (1 x 4 inch samples bent double) out-of-doors to the atmosphere and sunlight. The elastomers were then examined periodically for the appearance of cracks.

For evaluation in natural rubber, the following stock was used unless otherwise specified:

| | Parts |
|---|---|
| Smoked sheets | 100 |
| Zinc oxide | 5 |
| Carbon black | 45 |
| Stearic acid | 2 |
| Zn salt of 2-mercaptobenzothiazole+10% diortho-tolyl guanidine | 1.2 |
| Sulfur | 3 |
| Stabilizing agent as indicated. | |

The compounding of the stock was carried out in the usual manner on a rubber mill. The cure was for 30 minutes at 287° F.

*Example 1*

Table I gives results of the accelerated ozone test applied to rubber containing phenyl-beta-naphthylamine (PBNA) and N-phenylethylenediamine (PEN), its acetate, and its reaction product with $CO_2$ (carbonate).

*Table I*

| Stabilizing agent | Days to— | |
|---|---|---|
| | First slight cracks | Medium cracks |
| None | 0.5 | 1.5 |
| 3% PBNA | 2 | 3 |
| 1.5% PEN+1.5% PBNA | 3 | 6+ |
| 3% PEN | 2 | 3.5 |
| 1.5% PEN acetate+1.5% PBNA | 2.5 | 6+ |
| 3% PEN acetate | 2 | 3 |
| 1.5% PEN carbonate+1.5% PBNA | 2.5 | 6+ |
| 3% PEN carbonate | 1.5 | 3 |

6+ means that no medium cracks had appeared at the end of 6 days, when the test was stopped.

As illustrated in this example, although both phenyl-beta-naphthylamine and phenylethylenediamine, when used alone, retard the formation of cracks to an important extent, the mixture of the two according to the present invention produces a much greater effect even when the total amount of the mixture is the same as that of either agent used alone. Table I further shows that the same effects are obtained when the N-phenylethylenediamine base is replaced by its acetate and carbonate.

*Example 2*

Table II gives the results from the exposure of these stocks out-of-doors instead of in the accelerated test. It will be noted that the relation established by the accelerated test holds in this much slower outdoor test.

*Table II*

| Stabilizing agent | Days outdoor exposure to— | |
|---|---|---|
| | First slight cracks | Medium cracks |
| None | 1 | 21 |
| 3% PBNA | 21 | 105 |
| 1.5% PEN+1.5% PBNA | 28 | 126 |
| 3% PEN | 20 | 70 |
| 1.5% PEN acetate+1.5% PBNA | 59 | 140 |
| 3% PEN acetate | 31 | 105 |

*Example 3*

In addition to retarding cracking on exposure to sunlight and ozone, the mixed agents of the present invention also behave as ordinary antioxidants for rubbers, retarding the deterioration which leads to loss of extensibility and of tensile strength on exposure to the oxygen of the air. This antioxidant effect, like the anti-cracking effect, is much greater for the mixture than for the diarylamine and particularly for the N-arylethylenediamine used separately. This is shown in Table III and Table IV, which give the results of an accelerated aging (oxidation) test developed by the American Society for Testing Materials, involving heating the samples in a bomb at 70° C. with oxygen at 300 pounds pressure. The tensile strength was determined and the degree of aging expressed in terms of the percentage of the original strength retained.

*Table III*

| Stabilizing Agent | Percentage of original tensile strength retained after 7 days |
|---|---|
| None | 0. |
| 2% PBNA | 36. |
| 1% PEN+1% PBNA | 45. |
| 2% PEN | Too small to be significant. |
| 1% PEN acetate+1% PBNA | 41. |
| 2% PEN acetate | Too small to be significant. |
| 1% PEN carbonate+1% PBNA | 48. |
| 2% PEN carbonate | Too small to be significant. |

EXAMPLE 4

Table IV illustrates the synergistic effect of the two types of agents as also shown in elastomers other than natural rubber, by giving results of oxygen bomb aging for the following polychloroprene (neoprene) stock, cured 20 minutes at 307° F.:

| | Parts |
|---|---|
| Neoprene (Type GN) | 100 |
| Magnesia | 4 |
| Stearic acid | 0.5 |
| Carbon black | 29 |
| Zinc oxide | 5 |
| Stabilizing agent as indicated in Table IV. | |

*Table IV*

| Stabilizing Agent | Days in Bomb | Tensile Strength | Percent Retained |
|---|---|---|---|
| None | 0 | 2,875 | |
| | 14 | Melted | 0 |
| 2% PBNA | 0 | 2,900 | |
| | 14 | 2,125 | 73 |
| | 28 | 2,200 | 76 |
| 2% PEN | 0 | 2,975 | |
| | 14 | 2,100 | 71 |
| | 28 | 1,525 | 50 |
| 1% PEN+1% PBNA | 0 | 2,975 | |
| | 14 | 2,500 | 84 |
| | 28 | 2,400 | 81 |

I claim:

1. A 1,3-diene elastomer stabilized against deterioration in the vulcanized state by having incorporated therein prior to vulcanization from 0.25% to 5.0% of a diarylamine rubber antioxidant of the group consisting of diphenylamine and phenyl-beta-naphthylamine and from 0.25% to 5.0% of a compound of the group consisting of N-arylethylenediamine of the formula $ArNHCH_2CH_2NH_2$ and its carboxylic acid salts of carboxylic acids containing up to 8 carbon atoms, the aryl group being of the benzene series.

2. A 1,3-diene elastomer stabilized against deterioration in the vulcanized state by having incorporated therein prior to vulcanization from 0.25% to 5.0% of a phenyl-beta-naphthylamine and from 0.25% to 5.0% of N-phenylethylenediamine.

3. A 1,3-diene elastomer stabilized against deterioration in the vulcanized state by having incorporated therein prior to vulcanization from 0.25% to 5.0% of phenyl-beta-naphthylamine and from 0.25% to 5.0% of a N-phenylethylenediamine salt of a carboxylic acid containing up to 8 carbon atoms.

No references cited.